US010191668B1

(12) United States Patent
Traylor et al.

(10) Patent No.: US 10,191,668 B1
(45) Date of Patent: Jan. 29, 2019

(54) METHOD FOR DYNAMICALLY MODELING MEDIUM ERROR EVOLUTION TO PREDICT DISK FAILURE

(71) Applicant: EMC Corporation, Hopkinton, MA (US)

(72) Inventors: Rachel Traylor, San Jose, CA (US); Mark Chamness, Menlo Park, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 40 days.

(21) Appl. No.: 15/194,189

(22) Filed: Jun. 27, 2016

(51) Int. Cl.
*G06F 12/00* (2006.01)
*G06F 3/06* (2006.01)
*G06N 7/00* (2006.01)
*G06F 17/18* (2006.01)
*G06F 17/16* (2006.01)

(52) U.S. Cl.
CPC .......... *G06F 3/0616* (2013.01); *G06F 3/0653* (2013.01); *G06F 3/0689* (2013.01); *G06F 17/16* (2013.01); *G06F 17/18* (2013.01); *G06N 7/005* (2013.01)

(58) Field of Classification Search
CPC ..... G06F 3/0616; G06F 3/0653; G06F 3/0689
See application file for complete search history.

(56) References Cited

U.S. PATENT DOCUMENTS

| | | | | |
|---|---|---|---|---|
| 9,229,796 | B1 * | 1/2016 | Ma | G06F 11/008 |
| 9,244,790 | B1 * | 1/2016 | Ma | G06F 11/2221 |
| 9,535,779 | B1 * | 1/2017 | Ma | G06F 11/076 |
| 2004/0260967 | A1 * | 12/2004 | Guha | G06F 11/008 714/3 |
| 2005/0060618 | A1 * | 3/2005 | Guha | G06F 11/008 714/54 |
| 2008/0183987 | A1 * | 7/2008 | Ito | G06F 11/004 711/161 |
| 2011/0264949 | A1 * | 10/2011 | Ikeuchi | G06F 11/076 714/6.22 |
| 2012/0096309 | A1 * | 4/2012 | Kumar | G06F 11/00 714/6.22 |
| 2013/0290274 | A1 * | 10/2013 | Patil | G06F 17/30156 707/690 |
| 2015/0046756 | A1 * | 2/2015 | Sreekumaran | G06F 11/008 714/47.2 |

\* cited by examiner

*Primary Examiner* — Prasith Thammavong
(74) *Attorney, Agent, or Firm* — Womble Bond Dickinson (US) LLP (57) ABSTRACT

A method for predicting disk failures in a RAID environment is provided. A data collection center receives hard disk status information from one or more sets of hard disks in a storage system. For each of the sets of hard disks, the data collection center calculates a transitional probability that a hard disk will fail within a predetermined period of time based on the hard disk status information, and generates a first risk profile for the hard disk based on the calculated transitional probability. The data collection center then generates a second risk profile for a set of hard disks based on two or more of the first risk profiles, and compares the second risk profiles of the sets of hard disks to determine which of the sets of hard disks has a highest probability of failing within the predetermined period of time.

20 Claims, 8 Drawing Sheets

New Space State for Conditional Markov Model

| Bucket | 1, 2, ... 40 | (40, 50] | (50, 60] | (60, 70] | (70, 80] | (80, 90] | (90, 120] |
|---|---|---|---|---|---|---|---|
| Size | 1 | 10 | 10 | 10 | 10 | 10 | 30 |
| Bucket | (120, 150] | (150, 180] | (180, 210] | (210, 280] | (280, 350] | (350, 500] | (500, 700] |
| Size | 30 | 30 | 30 | 70 | 70 | 150 | 200 |
| Bucket | (700, 1000] | (1000, 2000] | (2000, 5000] | (5000, 10000] | (10000, ∞) | | |
| Size | 300 | 1000 | 3000 | 5000 | ∞ | | |

FIG. 6

Sample Data of Transition Probability Calculation with Bucketing

| Disk | Date | Medium Errors |
|---|---|---|
| 1 | 1/1/2016 | 30 |
| 1 | 1/2/2016 | 39 |
| 1 | 1/3/2016 | 41 |
| 1 | 1/4/2016 | 53 |
| 2 | 1/1/2016 | 32 |
| 2 | 1/2/2016 | 39 |
| 2 | 1/3/2016 | 42 |
| 2 | 1/4/2016 | 55 |

FIG. 7A

Transition Counts for Sample Data

| Transition | Count |
|---|---|
| 30 → 39 | 1 |
| 32 → 39 | 1 |
| 39 → [41, 50] | 2 |
| [41, 50] → [51, 60] | 2 |

METHOD FOR DYNAMICALLY MODELING MEDIUM ERROR EVOLUTION TO PREDICT DISK FAILURE

FIELD OF THE INVENTION

Embodiments of the present invention relate generally to data storage systems. More particularly, embodiments of the invention relate to predicting failure of a hard disk or a set of hard disks.

BACKGROUND

Several known predictors of hard disk electromechanical failure include reallocated sectors, reallocated event counts, current pending sector counts, and medium errors.

When a physical problem is encountered when trying to read data from a hard disk, and multiple read attempts fail, the hard disk experiences a medium error. Medium errors can be classified as a "real medium error" or a "head failure". A real medium failure indicates a marginal disk platter or a loss of proper magnetic properties. A head failure occurs when the read/write head has deteriorated. Conditions that may cause such an error are external conditions (e.g. dust) physically harming the disk head, imprecision in the physical write location, or improper alignment. A sudden power failure may also cause a medium error, but this is typically limited to one sector in most cases. Most medium errors are head failures or a defect on the magnetic medium.

Although medium errors have been studied as predictors of disk failure, only one particular count of medium errors have been used as a predictor of disk failures, and involved using a single threshold rather than an aggregate of the data. Traditionally, the one particular count of medium errors include an initial non-zero medium error count (NMEC) or a particular threshold NMEC. Thus, using only one particular count of medium errors, such as the NMEC, and a single threshold as a predictor of disk failures is an incomplete method of predicting disk failures with a limited predictive accuracy. Accordingly, what is needed to overcome the described shortcomings is a method for using a conditional Markov chain to model the evolution of medium errors until the death of the disk to more accurately monitor and predict disk failures.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, methods and systems for predicting disk failures in a RAID environment (e.g., a set of hard disks), such as in a data storage system. Embodiments are described for determining a transitional probability that a set of hard disks will fail within a predetermined period of time based on hard disk status information, which may be received from a data collection server. For example, the transitional probability may be determined based on an absorption Markov chain that is used to model the evolution of medium errors until the death of the set of hard disks. As used herein, a "Markov model" (also referred to as a Markov chain) refers to a stochastic process that transitions from one discrete state to another state in a state space, where the state space may be one of multiple medium error counts and/or a death of hard disk. Accordingly, as used herein, an "absorbing Markov chain" refers to a Markov chain where every state can reach an absorbing state, that is, the process may not leave such a state once reached. For example, in the case of medium errors, the absorbing state is a disk's failure, or death. Note that a Markov model provides a probability of failure for a hard disk, which may be used to generate a risk profile for the hard disk (e.g. a first risk profile) based on the calculated probability of failure for the hard disk. Accordingly, these probabilities may be combined to determine a probability of failure of a set of hard disks (e.g. a RAID group), which may be used to generate an aggregated risk profile (e.g. a second risk profile) for the set of hard disks based on combining two or more of the risk profiles.

In one embodiment, the data collection server receives hard disk status information from one or more sets of hard disks in a storage system. The hard disk status information may include one or more states within the set of hard disks, a number of hard disks within the set of hard disks, and an indicator of how many hard disks have failed within the set of hard disks. As used herein, a "state" refers to a medium error count, such as a NMEC, but is not limited to only medium errors. For example, a "state" may also refer to any other error that is commonly experienced in a hard disk failure. As used herein, a "set of hard disks" may refer to a log history of one or more hard disks in a storage system, which may be used to calculate a transitional probability of a hard disk and to generate a risk profile for the hard disk based on the calculated transitional probability. In addition, a set of hard disks may also refer to a physical collection of one or more hard disks in a group of hard disks or a storage system.

According to some embodiments, for each of the sets of hard disks, the data collection server calculates a transitional probability that a hard disk will fail within a predetermined period of time based on the hard disk status information, and generates a risk profile for the hard disk (i.e., a first risk profile) based on the calculated transitional probability. The predetermined period of time may represent 1 day, 7 days, 30 days, and/or 60 days. In one embodiment, the data collection server generates an aggregated risk profile for a set of hard disks (i.e., a second risk profile) based on two or more of the risk profiles. Then, according to some embodiments, the data collection server compares the aggregated risk profiles of one or more sets of hard disks to determine which of the sets of hard disks has a highest probability of failing within the predetermined period of time.

As used herein, a "risk profile" refers to a quantitative analysis of one or more types of threats/risks a client, a data storage system, and/or a customer data center faces. For example, a data storage system may be organized into one or more RAID groups that will lose data upon two or more disks failing before any are replaced. As such, a risk profile for a hard disk (also referred to as a first risk profile, a single-disk risk profile, etc.) may be generated based on a calculated transitional probability that determines the transitional probability that the hard disk will fail within a predetermined period of time based on hard disk status information. In addition, two or more risk profiles may be aggregated to generate an aggregated risk profile for a set of hard disks (also referred to as a second risk profile). As such, aggregated risk profiles may be used to provide comprehensive rankings of one or more RAID groups to determine which of the RAID groups has a highest probability of failing within a predetermined period of time. Accordingly, one of the advantages of the risk profiles is that they can allow a customer data center to predict future hard disk failures and thus prioritize hard disk failures more effectively, which in turn allows for greater flexibility, fewer unnecessary recalls, and better monitoring for the underlying risk of the one or more RAID groups. Another advantage is that the specialized databases of the data collection server increase the accuracy and reduce the time required for a customer data center server to pinpoint future hard disk failures among the multiple sets of hard disks.

In one embodiment, one or more states within the set of hard disks includes at least one of an initial state of the hard disk, a second state of the hard disk that represents, a third state of the hard disk, and an absorbing state of the hard disk. For example, the initial state of the hard disk represents a non-zero error count as a starting point for the transitional probability (e.g., "state i"), the second state of the hard disk (e.g., "state j") represents a second error count for the transitional probability that falls between the initial state and the third state, the third state of the hard disk represents a third error count for the transitional probability that falls between the second state and the absorbing state, and the absorbing state of the hard disk represents a status of FAILED for the hard disk (e.g., "state D"). As used herein, a "transitional probability" (also referred to as "$p_{ij}$") refers to the probability of a process transitioning from state i to state j in one unit of time (e.g., one unit of time is one day). Note that that the probability of transitioning from state i to state j depends on the current state and not on any other preceding states, and that the medium error count can transition from any state i to any other state j, as long as j≥i.

According to some embodiments, the hard disk information is a non-zero error indicator that may include a medium error, a remote access service (RAS) error, a hardware error, a protocol error, a controller error, and a driver state error. Further, the hard disk status information also includes a manufacturer and a model of a storage system that houses the hard disk.

In one embodiment, when calculating the transitional probability, the data collection server also queries a hard disk failure record for each of the sets of hard disks, the hard disk failure record including a date that the hard disk failed, where the date is used as a timestamp to classify the hard disk within one state. Further, the data collection server determines an overall count number of transitions from one state to another state for each of the sets of hard disks, and then determines a second count number of transitions from the initial state of the hard disk to the second state, and a third count number of transitions from the initial state to at least one of the third state and/or the absorbing state of the hard disk.

In some embodiments, the transitional probability may also be used to determine a single state transition probability (also referred to as a one-step transition probability) that determines an imminent transition from one state to another state based on a set of states within the set of hard disks; a predetermined state transition probability (also referred to as a N-step transition probability) that determines the probability of one or more state transitions in one or more predetermined number of days; an average period of time in a specified state (also referred to as a mean time spent in transient states) that determines an expected number of days that the hard disk will be within the specified state; and an expected period of time to failure of the set of hard disks (also referred to as an expected time to absorption) that determines an expected number of days that the hard disk has to reach the absorption state. Note that the expected time to absorption is the expected time to a disk's failure given that the current NMEC is in state i.

Figure 1:
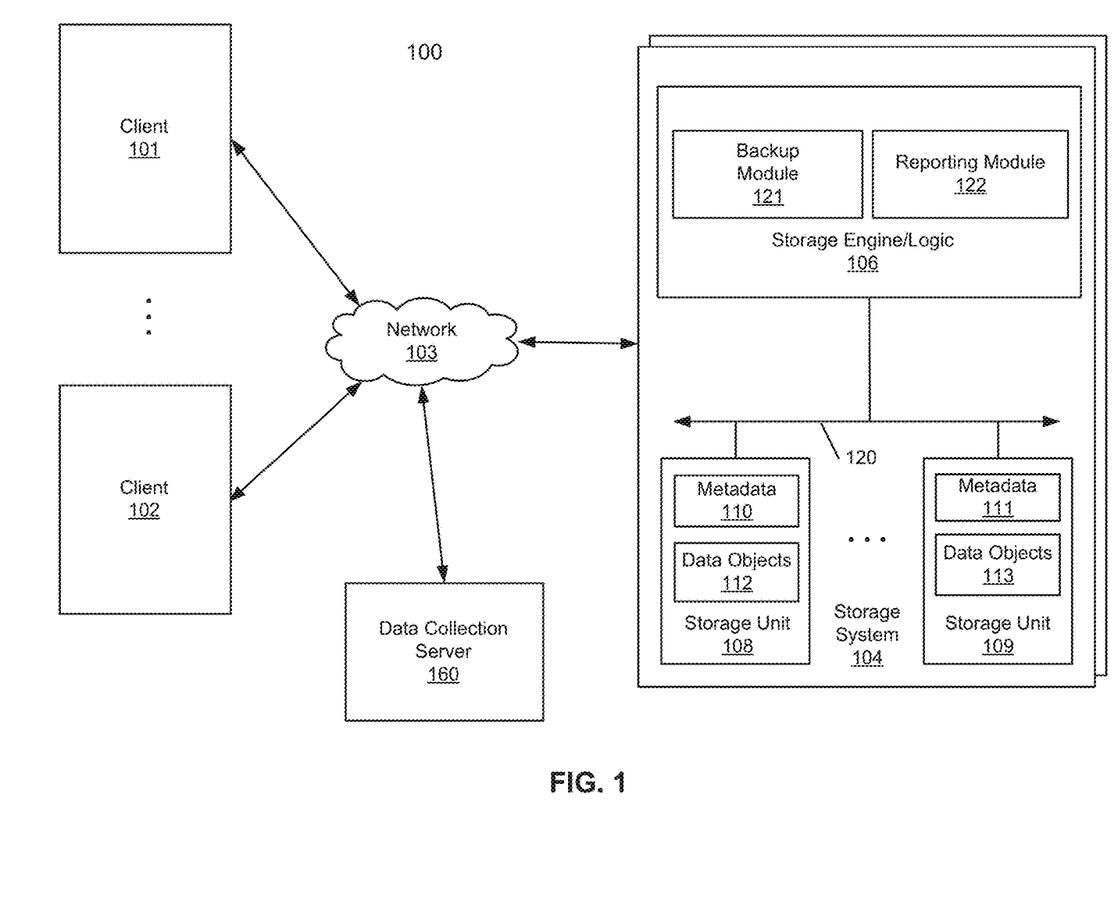
FIG. 1 is a block diagram illustrating a data storage system according to one embodiment of the invention.

FIG. 1 is a block diagram illustrating a data storage system according to one embodiment of the invention. System 100 includes, but is not limited to, one or more client systems 101-102 communicatively coupled to storage system 104 and data collection server 160 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Storage system 104 and data collection server 160 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple client systems with access to shared data and/or to backup/restore data. Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof) and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup module 121 and reporting module 122. Backup module 121 is configured to receive and back up data from a client (e.g., clients 101-102) and to store the backup data in any one or more of storage units 108-109. Reporting module 122 can generate a customer report and transmit the customer report to the data collection server 160 via network 103. Storage system 104 may include interconnect 120 that allows backup module 121 and reporting module 121 to access the one or more storage units (e.g. storage units 108-109).

Storage units 108-109 may be implemented locally (e.g., single node operating environment) or remotely (e.g., multi-node operating environment) via interconnect 120, which may be a bus and/or a network (e.g., a storage network or a network similar to network 103). In one embodiment, storage units 108-109 stores, but is not limited to, metadata 110-111 and data objects 112-113. Storage units 108-109 may include a single storage device such as a hard disk, a tape drive, a semiconductor memory, multiple storage devices such as a redundant array system (e.g., RAID), and a system for storage such as a library system or network attached storage system, or any other appropriate storage device or system. Some of storage units 108-109 may be located locally or remotely accessible over a network.

In some embodiments, metadata 110-111 may be stored in at least some of storage units 108-109, such that files can be accessed independent of another storage unit. Metadata of each storage unit includes enough information to provide access to the files it contains. The metadata may include fingerprints contained within data objects 112-113, where a data object may represent a data chunk, a compression region (CR) of data chunks, or a container of one or more CRs. Fingerprints are mapped to a particular data object via metadata 110-111, which enable the system to identify the location of the data object containing a chunk represented by a particular fingerprint.

Data collection server 160 may be any type of servers or a cluster of one or more servers used for data collection. Data collection server 160 can receive customer reports from one or more customer data centers (e.g., customer data centers 201 of FIG. 2). Further, data collection server 160 may include multiple databases and/or modules to collect data for predicting disk failures in one or more sets of hard disks. For example, the multiple databases and modules of data collection server 160 may be used to determine a transitional probability that a hard disk will fail after receiving an initial NMEC.

Data collection server 160 may be configured to communicate with each of the storage systems (e.g., storage system 104) to configure the storage systems and collect data from them. Data collection server 160 may be associated with a storage provider such as EMC® Corporation that provides the storage appliances, such as storage system 104. Data collection server 160 can collect various data from the storage appliance devices and analyze them. In one embodiment, data collection server 160 can also, based on the analysis, configure or reconfigure any of the storage appliance devices by sending the configuration information (e.g., in a form of script, extensible markup language or XML) to the devices over a network, such as network 103. Such operations can be performed dynamically without having to shut down or disrupt operations of the storage appliance devices.

In some embodiments, data collection server 160 receives hard disk status information from one or more sets of hard disks in a storage system (e.g., storage system 104). The hard disk status information may include one or more states within the set of hard disks, a number of hard disks within the set of hard disks, and an indicator of how many hard disks have failed within the set of hard disks. For each of the sets of hard disks, data collection server 160 calculates a transitional probability that the set of hard disks will fail within a predetermined period of time based on the hard disk status information, and generates a risk profile for the set of hard disks based on the calculated transitional probability. Accordingly, data collection server 160 compares the risk profiles of one or more sets of hard disks to determine which of the sets of hard disks has a highest probability of failing within the predetermined period of time.

Note that some or all of the components as shown and described above (e.g., storage service engine 106 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
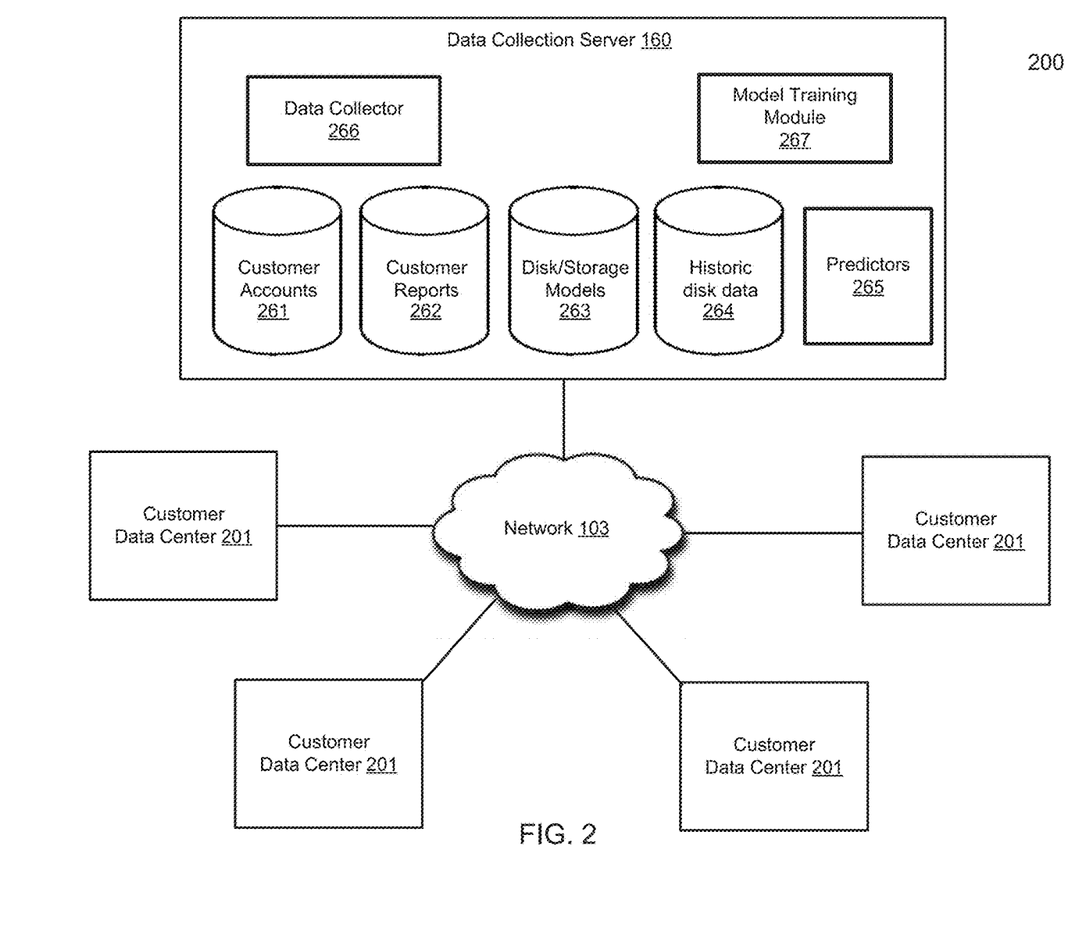
FIG. 2 is a block diagram illustrating an example of a system for determining a probability of one or more set of hard disk failures to predict disk failures in a storage system according to one embodiment of the invention.

FIG. 2 is a block diagram illustrating an example of a system for determining a probability of one or more set of hard disk failures to predict disk failures in a storage system according to one embodiment of the invention. System 200 includes, but is not limited to, one or more customer data centers 201 communicatively coupled to data collection server 160 over network 103. Data collection server 160 can receive customer reports from one or more customer data centers 201. A customer report can include a report of at least one hard disk that has incurred an initial non-zero medium error count (NMEC) or has failed. A customer report can further include a unique identifier of a hard disk, a manufacturer and model of a hard disk, or a storage system manufacturer and model that the hard disk forms a part of.

Data collection server 160 may include multiple databases and/or modules. According to one embodiment, data collection server 160 includes, but is not limited to, customer accounts 261, customer reports 262, disk/storage models 263, historic disk data 264, predictors 265, data collector 266, and model training module 267. For example, the multiple databases and modules of data collection server 160 may be used to determine a transitional probability that a hard disk will fail after receiving an initial NMEC. Note that databases/modules 261-267 can be implemented on a computing system 800 as described below in FIG. 8. Databases/modules 261-267 can be implemented using any database software, such as Microsoft SQL Server, Oracle, IBM DB2, SAP Sybase, and the like.

Customer database 261 can include a unique customer identifier, customer contact information, a list of storage systems and/or hard disks that the customer has installed at a customer data center 201. A customer report received by the data collection server 160 can include the customer identifier. The customer report can include a storage system identifier of a storage system the customer has installed at the customer data center 201. The customer reports can further include an identifier of a hard disk that forms a part of the storage system. From the foregoing information, the data collection center 160 can look up the hard disk manufacturer and model so that the data collection center 160 can record the hard disk manufacturer and model with, along with the report of an initial NMEC or failure for the hard disk.

Customer reports database 262 can include a date/time stamp that a report was generated by the customer data center, a date/time stamp that the report was received by the data collection center 160, a customer identifier, a customer data center identifier, a storage system identifier and a hard disk identifier so that the data collection server 160 can generate records for the disk statistics database 264 for a hard disk that is as specific as possible, from the customer report.

Disk/storage models database 263 record can include a field for a storage system identifier that uniquely identifies particular instance of a storage system, its manufacturer, and the particular model of storage system, e.g. EMC® VNXe3200. Disk/storage models database 163 can further include records that identify particular models of hard disks, e.g. Seagate ST1000DM003. Hard disk model records may include a field for a unique identifier of a hard disk, the manufacturer of the hard disk, and particular model of the hard disk.

Hard disk historic data database 264 can store historic data about a plurality of hard disks. A hard disk record can be generated for hard disk historic data database 264 in response to parsing a customer report to obtain hard disk initial NMEC and failure information. In one embodiment, a new record can be generated for each instance of a customer report for a hard disk. For example, a record may be generated in hard disk historic data database 264 when a customer reports that a specific hard disk reports an initial NMEC. An additional record can be generated for the same hard disk if a subsequent report indicates that the NMEC for the hard disk has increased. Yet another record may be generated for the same hard disk if a subsequent report indicates that the hard disk FAILED. Alternatively, or in addition, a single record may be generated representing the life of a hard disk. The record can store the date and initial NMEC, then be updated with the date of the failure of the hard disk when the failure is reported in a future customer report.

Predictors 265 can store records including probabilities of failure of a hard disk based on historic hard disk data that can be used to determine a transitional probability that a hard disk will fail, given an initial NMEC and date of the initial NMEC. As such, predictors 265 may include a specialized database of multiple predictors for a customer data center. Further, in one embodiment, the probability that a hard disk will fail can be based at least in part on the manufacturer and model of hard disk that incurred the initial NMEC. Predictors 265 can be generated by analyzing a selected set of historical data records from the disk historic data database 264.

Data collector 266 can receive customer reports and hard disk information from a wide customer base that can be used to generate a substantial body of data, which can then be analyzed to generate a transitional probability of a hard disk based, at least in part, on one or more states of the hard disk. For example, data collector 266 receives data from a storage system (e.g., storage system 104) that is needed to generate a transitional probability that at least one set of hard disks in a system of hard disks will fail in a predetermined period of time, based at least in part on a NMEC, which also corresponds to an initial state. For example, data collector 266 may receive hard disk information from multiple customers, including one or more states, a number of hard disks, and an indicator of how many hard disks have failed within the set of hard disks. Note that the data collector is not limited to medium errors and can receive data from other hard disk errors, including any error that evolves on a discrete space (e.g., a RAS error, a hardware error, a protocol error, a controller error, and/or a driver state error).

In one embodiment, model training module 267 is used to create one or more models (e.g., disk/storage models, disk failure probability models, transitional probability models, risk profile models, etc.) based on the collected historic disk data. For example, model training module 267 creates disk/storage models 263 for data collection server 160 based on historic disk data 264.

According to some embodiment, the databases and modules of data collection server 160 may be used to calculate a transitional probability that a set of hard disks will fail within a predetermined period of time based on hard disk status information received by the data collection server 160. Further, data collection server 160 may generate a risk profile for the set of hard disks based on the calculated transitional probability, where the risk profiles are then compared to determine which of the sets of hard disks has a highest probability of failing within a predetermined period of time.

Figure 3:
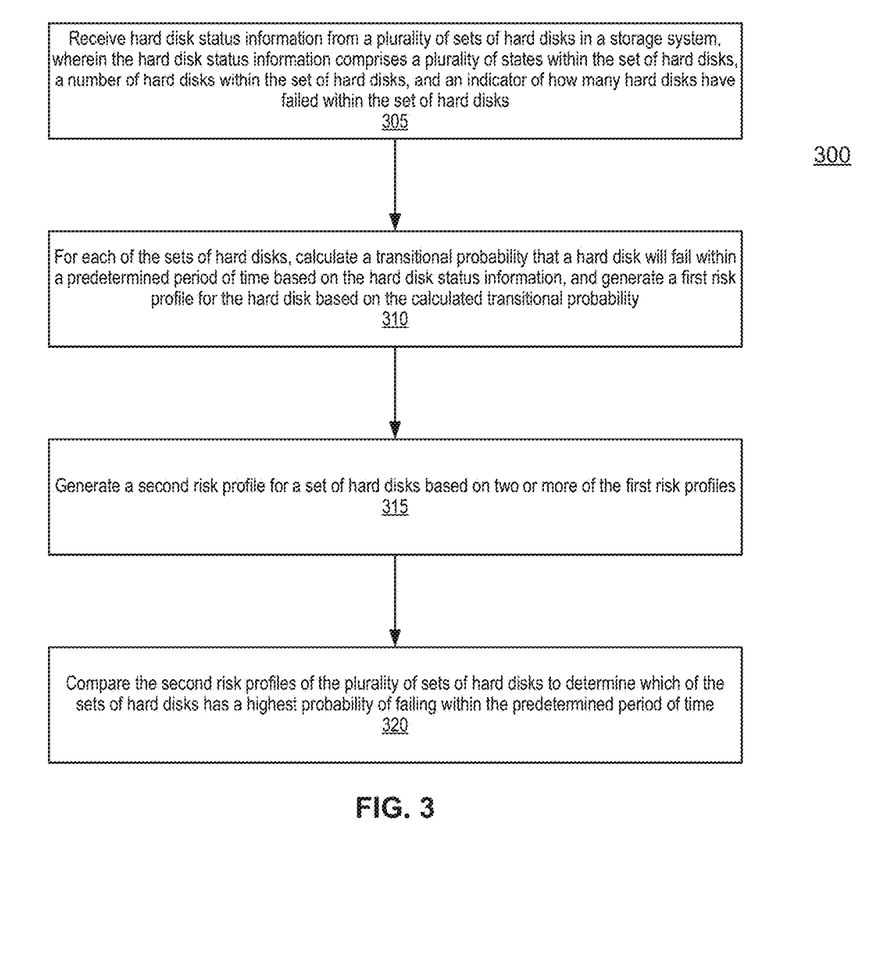
FIG. 3 is a flowchart illustrating a method for predicting disk failures in a redundant array of independent disks (RAID) environment according to one embodiment of the invention.

FIG. 3 is a flowchart illustrating a method for predicting disk failures in a redundant array of independent disks (RAID) environment according to one embodiment of the invention. Flowchart 300 can be performed by processing logic which may be implemented in software, firmware, hardware, or any combination thereof. For example, flowchart 300 can be performed by a data collection server (e.g., data collection server 160). Referring now to FIG. 3, at block 305, processing logic receives hard disk status information from one or more sets of hard disks in a storage system. For example, the data collection server receives hard disk status information that includes one or more states within the set of hard disks, a number of hard disks within the set of hard disks, an indicator of how many hard disks have failed within the set of hard disks, and a non-zero error indicator, where the non-zero error indicator may represent, but is not limited to, a medium error, a remote access service error, a hardware error, a protocol error, a controller error, and a driver state error.

At block 310, for each of the sets of hard disks, processing logic calculates a transitional probability that a hard disk will fail within a predetermined period of time based on the hard disk status information, and generates a first risk profile for the hard disk based on the calculated transitional probability. For example, the predetermined period of time may represent 1 day, 7 days, 30 days, and/or 60 days. Further, the processing logic may also determine other applicable applications using the transitional probability, such as a single state transition probability, a predetermined state transition probability, an average period of time in a specified state, and an expected period of time to failure of the set of hard disks (as described above).

At block 315, processing logic generates a second risk profile for a set of hard disks based on two or more of the first risk profiles. In one embodiment, a second profile may represent an aggregated risk profile that combined two or more single-disk risk profiles for a set of hard disks, where the single-disk profiles are generated from the calculated transitional probabilities. Accordingly, these aggregations of risk profiles (i.e., two or more of the first risk profiles) may generate the aggregated risk profile for the set of hard disks (e.g. a RAID group), which may then be used to determine the risk of data loss to that set of hard disks.

Further, at block 320, processing logic then compares the second risk profiles of the plurality of sets of hard disks to determine which of the sets of hard disks has a highest probability of failing within the predetermined period of time. For example, the data collection server can use the second risk profiles to provide comprehensive rankings of one or more RAID groups to determine which of the RAID groups has the highest probability of failing. As such, risk profiles allow a customer support center to predict future hard disk failures of a hard disk or a set of hard disks, rather than waiting for the hard disks to die. Accordingly, the risk profiles allow the customer support center to prioritize hard disk failures more effectively by focusing their resources on the set of hard disks with the highest probability of failing.

Figure 4:
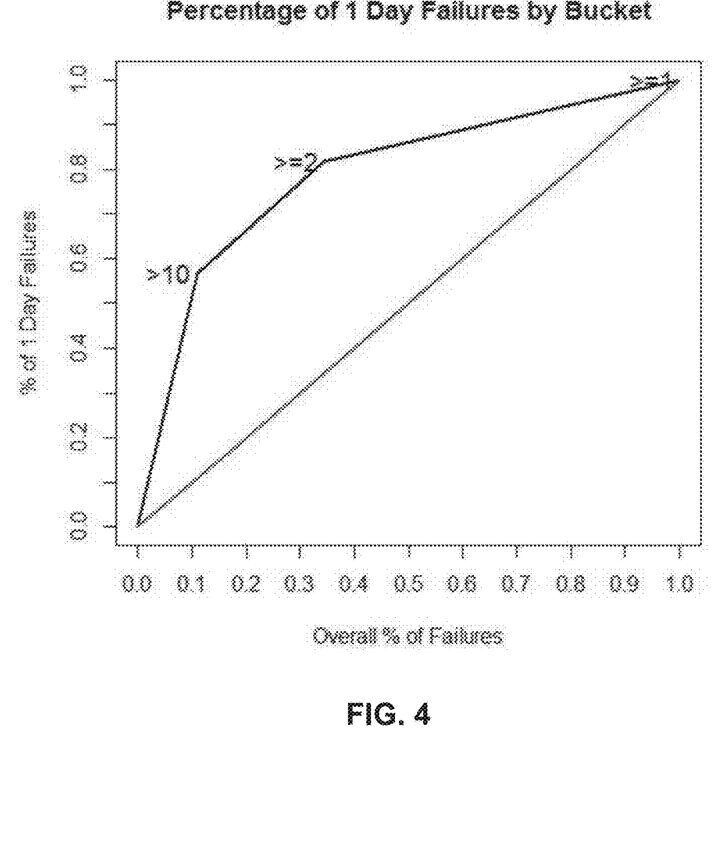
FIG. 4 is a detailed graph illustrating a percentage of one day failures of hard disks having different classifications of NMECs according to one embodiment of the invention.

FIG. 4 is a detailed graph illustrating a percentage of one day failures of hard disks having different classifications of NMECs according to one embodiment of the invention. As illustrated in FIG. 4, a data collection server can represent one-step transition probabilities as a transition matrix "P", where the entries of the matrix are given by $P_{ij}=p_{ij}$. In the case of medium errors, this is represented as an upper triangular matrix, since $p_{ij}=0$ for i>j. For example, as shown in FIG. 4, the detailed graph illustrates the probability of surviving past time t conditioned upon an initial NMEC (e.g., roughly 80% of one day failures had an initial NMEC ≥2).

Further, a transition matrix can be used to calculate various quantities of interest, which may be included in a risk profile. For example, an example of a transition matrix for a four state absorbing Markov chain can be represented as:

$$P = \begin{bmatrix} p_{11} & p_{12} & p_{13} & p_{14} & p_{1D} \\ 0 & p_{22} & p_{23} & p_{24} & p_{2D} \\ 0 & 0 & p_{33} & p_{34} & p_{3D} \\ 0 & 0 & 0 & p_{44} & p_{4D} \\ 0 & 0 & 0 & 0 & 1 \end{bmatrix} \begin{matrix} \text{from } i=1 \\ \text{from } i=2 \\ \text{from } i=3 \\ \text{from } i=4 \\ \text{from } i=\text{death.} \end{matrix}$$

to j = 1   to j = 2   to j = 3   to j = 4   to j = death

In the above example, each row represents a state (number of medium errors) a disk has "today," and each column represents a state (number of medium errors) a disk has "tomorrow." Here, $p_{ij}$ represents the probability that a disk with i medium errors today will have j medium errors tomorrow. For example, $p_{12}$ is the probability that a disk observed with one medium error today will have two medium errors upon observation tomorrow. Note that a hard disk does not "lose" medium errors, as such $p_{ij}=0$ for i>j. For example, $p_{13}=0$, since this is the probability that a disk with 3 medium errors today has one medium error tomorrow.

Further, $p_{iD}$ represents the probability that a disk with i medium errors today dies (D) tomorrow, $p_{DD}=1$ because a disk that is currently dead will not be function tomorrow, and $P_{Dj}=0$ for j≠D because a dead disk does not change a medium error count as the disk is no longer in use. Note that the sum of each row i is 1, this is because a disk in state i today needs to transition somewhere, even if it is back to its current state (e.g., 1 medium error today→1 medium error tomorrow).

For example, assuming that the possible medium error counts before a disk dies are 1, 2, 3, and DEATH, the values of each probability of the transition matrix (P) are:

$$P = \begin{bmatrix} 0.7 & 0.2 & 0.08 & 0.02 \\ 0 & 0.8 & 0.1 & 0.1 \\ 0 & 0 & 0.5 & 0.5 \\ 0 & 0 & 0 & 1 \end{bmatrix}.$$

According to some embodiments, the transition matrix, as shown above, can be used to calculate various quantities of interest, including an n-step transition probability, a fundament matrix, and an absorption probability. For example, to determine the n-step transition probability, it is assumed that the evolution of medium errors is memoryless (i.e. the current medium error count is only dependent on the previous day's medium error count and nothing else in the past), and that any time the medium error count is observed it is the "initial" count (i.e., initial NMEC). Note that a medium error count of 10 or greater (conditioned on a disk having medium errors) rather than an initial medium error count of 1 has a higher probability of failure on the following day. As such, the n-step transition probability provides the probability of moving from state i to state j in n steps (i.e., a predetermined period of time) is given by $p_{ij}^{(n)}$, and these probabilities are given by the entries of the matrix $P^n$.

For example, to determine the fundamental matrix, P is expressed in the following block diagonal form:

$$P = \begin{bmatrix} Q & R \\ 0 & 1 \end{bmatrix},$$

where Q is a t×t matrix and is the matrix of all the transition probabilities of the transient states. Continuing with the above example of P, Q is expressed in the following block diagonal form:

$$Q = \begin{bmatrix} 0.7 & 0.2 & 0.08 \\ 0 & 0.8 & 0.1 \\ 0 & 0 & 0.5 \end{bmatrix}.$$

and R is a 1×t vector of the transition probability from a transient state to absorption (death=D). R is expressed in the following block:

$$R = \begin{bmatrix} 0.02 \\ 0.1 \\ 0.5 \end{bmatrix}.$$

The fundamental matrix (N) is an invertible for an absorbing Markov chain and may be used to determine an expected time to absorption, where the entries of N are given by $n_{ij}$ to represent the expected number of times the process enters the transient state $s_j$ if it starts in transient state $s_i$. The fundament matrix may be represented as:

$$N := (I-Q)^{-1},$$

where N is the expected time to absorption. Accordingly, if $t_i$ is the expected number of days before the disk dies, given that the initial medium error count was $s_i$, then we denote $t=(t_1; \ldots t_k, \ldots)$ and thus t=N1.

Further, to determine the absorption probability where the absorbing state of the hard disk represents a status of FAILED for the hard disk, let $b_{ij}$ be the probability that the disk will die in the absorbing state $s_j$ if it started in the transient state $s_i$. Note that the absorption probability may be used to determine an expected number of days that the hard disk has to reach the absorption state (i.e., the death of the hard disk). Accordingly, $b_{ij}$ is the probability that a disk will die the day following the medium error count j, if it has an initial medium error count i. As such, if B is the matrix with entries $b_{ij}$, then B=NR and is used to provide the probability that a disk will die in a predetermined state (e.g., $s_j$) after its initial NMEC.

Figure 5:
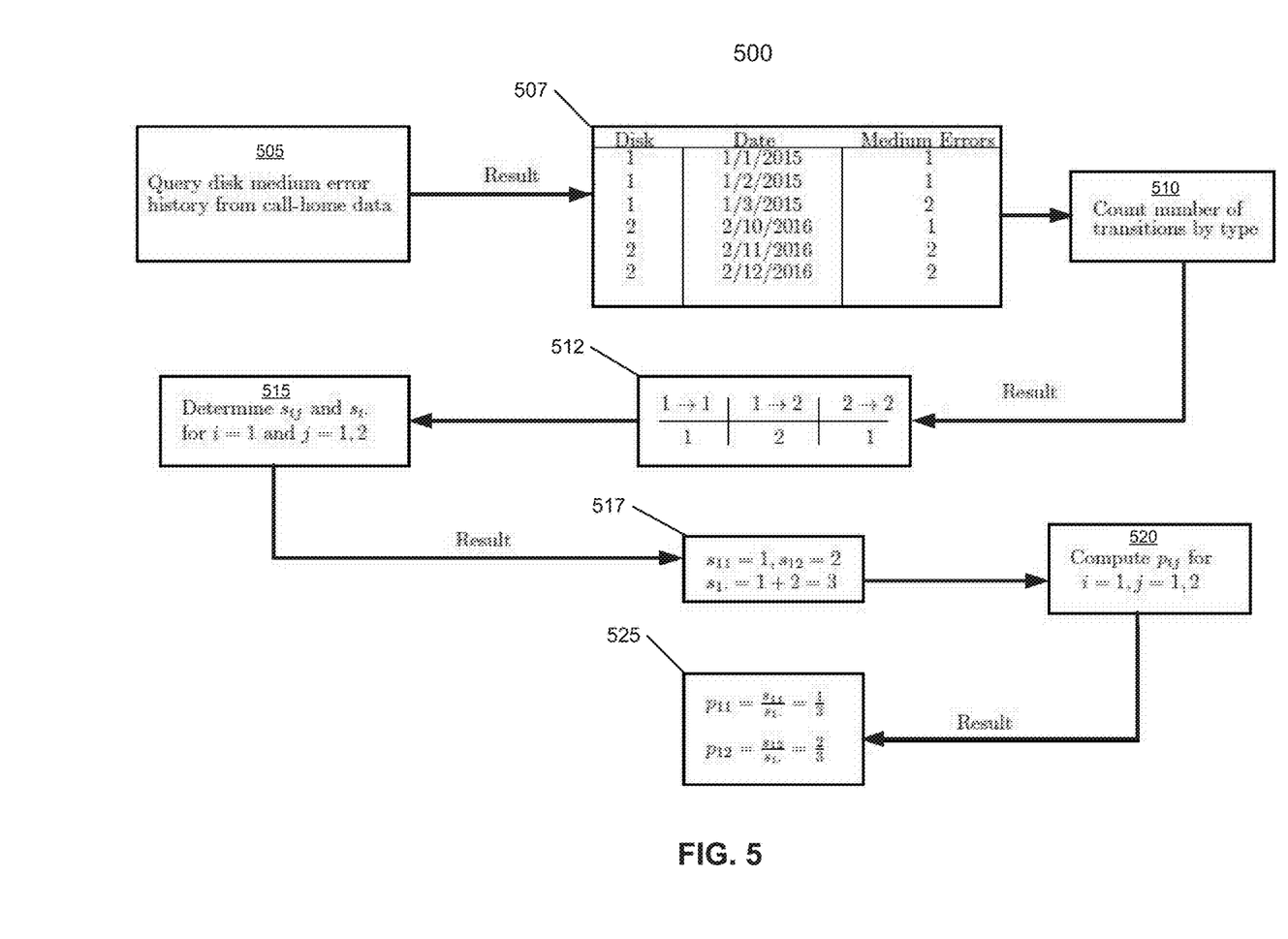
FIG. 5 is a flowchart illustrating a method for calculating a transitional probability of a set of hard disks according to one embodiment of the invention.

FIG. 5 is a flowchart illustrating a method for calculating a transitional probability of a set of hard disks according to one embodiment of the invention. Flowchart 500 can be performed by processing logic which may be implemented in software, firmware, hardware, or any combination thereof. For example, flowchart 500 can be performed by a data collection server (e.g., data collection server 160). Referring now to FIG. 5, at block 505, processing logic queries a medium error history from call-home data of a customer data center. For example, the data collection server queries a hard disk failure record for each of the sets of hard disk, and uses the medium error history of disks to identify which of the sets of hard disks has experienced at least one medium error.

At block 507, the result of the query, for example, identifies that two disks have experienced at least one medium error. The result of the query includes a number of disks that have experienced at least one medium error, a date that the error occurred, and a number of medium errors of the identified disk at different dates. Note that the dates the medium errors occurred are used as timestamps in order to classify transitions from one state to another state (e.g., "1" medium error to "2" medium errors).

At block 510, processing logic counts a number of transitions of the disks by different transitions types. For example, the data collection server determines an overall count number of transitions from one state to another state for each of the sets of hard disks. Based on the results of block 507, the data collection server can identify multiple transitions. For example, there are two transitions from State 1 (1 medium error) to State 2 (2 medium errors), and they occurred respectively in Disk 1 on dates, Jan. 2, 2015→Jan. 3, 2015, and Disk 2 on dates, Feb. 11, 2016→Feb. 12, 2016. Note that it is irrelevant that the transitions occurred on two different disks.

At block 512, the result of counting the number of transitions, for example, identifies three different number of transitions types (e.g., 1→1, 1→2, 2→2). The three different number of transitions types are from one medium error to one medium error, one medium error to two medium errors, and two medium errors to two medium errors. Accordingly, block 512 also provides the count within each transition type (e.g., 1→1=1 count, 1→2=2 counts, 2→2=1 count).

At block 515, processing logic determines a number of transitions from state i to state j (e.g., $s_{ij}$) and a number of counts of the number of transitions from state i to any and all other remaining states (e.g., $s_i$.). For example, the data collection server can determine a second count number of transitions from the initial state to a second state, and a third count number of transitions from the initial state of the hard disk to at least one of a third state of the hard disk and/or the absorbing state.

At block 517, the result of determining $s_{ij}$ and $s_i$., for example, identifies that there are 2 transitions from State 1 to State 2 (e.g., $s_{12}$=2), and there is 1 transition from State 1 to State 1 (e.g., $s_{11}$=1). Accordingly, there are a total of 3 transitions from State 1 to State j, where j=1, 2 and thus, $s_1$.=2+1=3.

At block 520, processing logic computes a transitional probability (e.g., $p_{ij}=(s_{ij}/s_i.)$ for i=1 and j=1, 2 to determine the probability that two disks of a set of disks that was observed to have at least one medium error today will have one and two medium errors, respectively, upon observation tomorrow. As shown at block 525, the result of the computing $p_{ij}$, for example, identifies that $p_{12}=(s_{12}/s_i.)$=2/3. Accordingly, if the above method is used to calculate all states i, then all of the transition probabilities may be calculated. For example, the results are stored in the transition matrix P (as discussed above in connection with FIG. 4) with entries $p_{ij}$, where i represents the row and j represents the column, and thus $p_{12}$ will be the entry in row 1, column 2.

Figure 6:
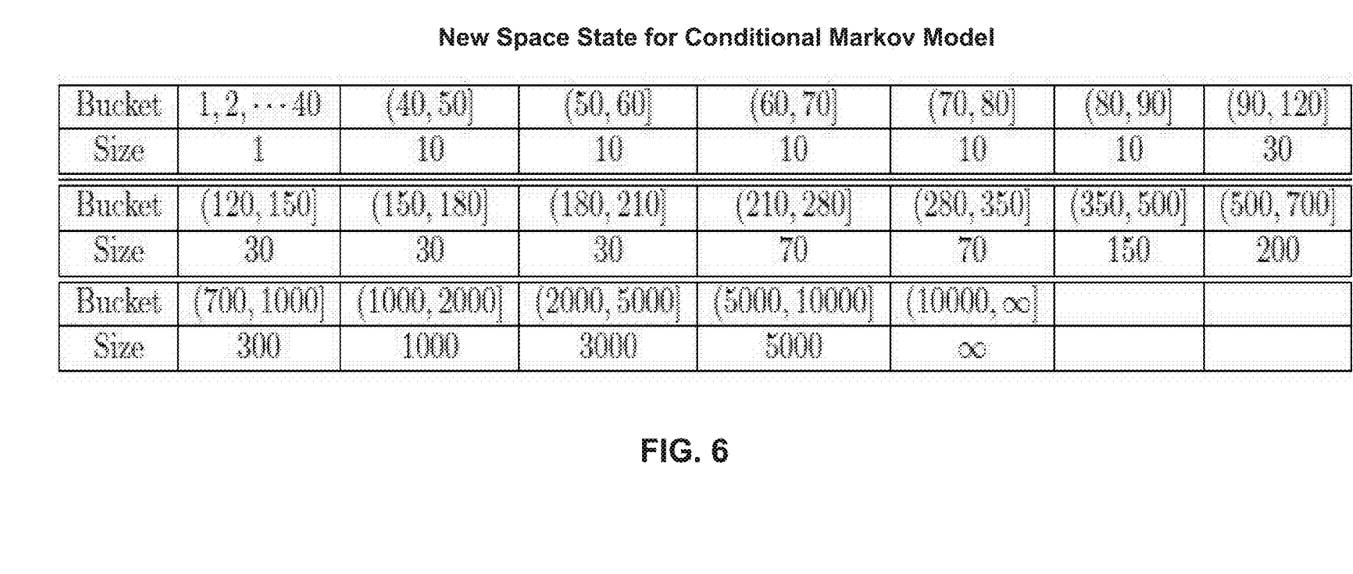
FIG. 6 is a table illustrating one or more statistical categories and sizes used to calculate transitional probabilities of one or more sets of hard disks according to one embodiment of the invention.

FIG. 6 is a table illustrating one or more statistical categories and sizes used to calculate transitional probabilities of one or more sets of hard disks according to one embodiment of the invention. As used herein, a "bucket" refers to a statistical category that can be assigned for a set of hard disks. For example, as illustrated in FIG. 6, a first bucket can group hard disks having medium error counts of 1-40, which may also be referred to as States 1-40. Further, FIG. 6 illustrates a new state space and a nonparametric analysis of medium error counts that are used to determine transitional probabilities. It can be seen that a 150,000×150,000 matrix would have 22.5 billion entries, which is an unmanageable size. Thus, the size of the matrix is decreased by redefining various states to include more than one medium error counts in certain cases (e.g., redefining medium errors 1-40 to a first bucket). Note that the bucketing size and error count is arbitrary and depends on data, business, and/or computational needs of a customer data center. For example, in FIG. 6, there are 58 states plus a state for the DEATH of the disk, where States 1-40 correspond to medium error counts 1-40, respectively, State 41 corresponds to medium error counts 41-50, and State 42 corresponds to medium error counts 51-60, etc. Accordingly, using this bucketing method is a better way to calculate transitional probabilities of matrices of any size.

Figure 7A:
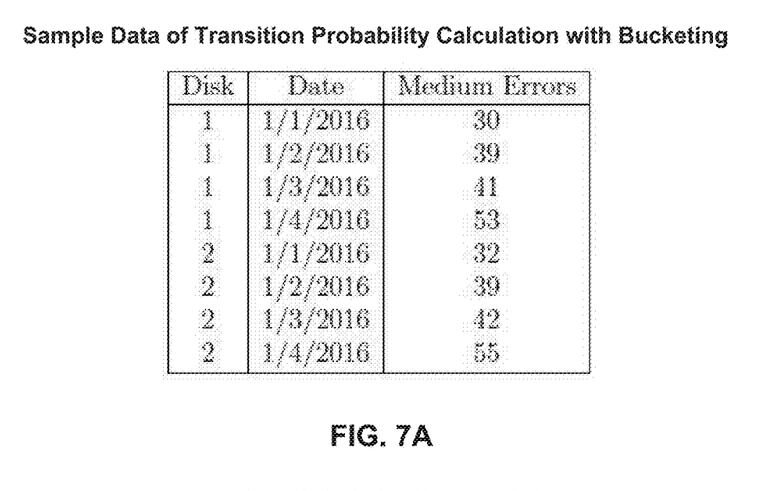
FIGS. 7A-B are tables illustrating hard disk status information and transition counts of one or more hard disks according to one embodiment of the invention.
Figure 7B:
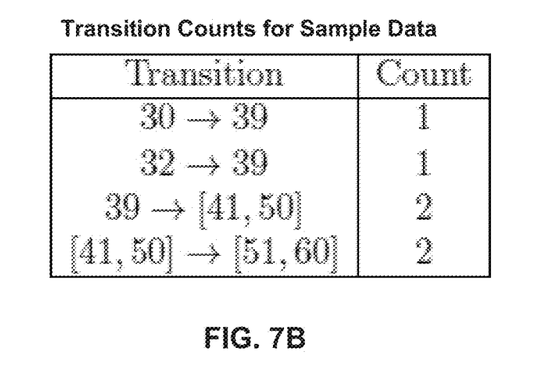

FIGS. 7A-B are tables illustrating hard disk status information and transition counts of one or more hard disks according to one embodiment of the invention. FIG. 7A illustrates how transition probabilities are calculated based on the bucketing data of FIG. 6. Likewise, FIG. 7B illustrates the transition counts based on the data of FIG. 7A.

For example, based on FIGS. 6 and 7A-B, if the medium error count is 40 or less, it corresponds to a "single medium error" state (also referred to as the first bucket). As such, it can be seen that there is 1 transition from 30→39 that occurred in Disk 1 on Jan. 2, 2016. Similarly, there is 1 transition from 32→39 that occurred in Disk 2 on Jan. 2, 2016. These are two separate transitions, because the medium error counts 1, 2, . . . , and 40 all represent distinct un-bucketed states.

Further, there are two transitions from 39→[41; 50], where Disk 1 experienced a transition from 39→41, and Disk 2 experienced a transition from 39→42. Since [41, 50] (or (40,50]) is considered a single state and 39 is also considered a single state, it can be seen that there are two transitions from State 39 into the State that corresponds to [41; 50] (i.e., 39→[41; 50]=2 counts). Accordingly, to illustrate counting transitions between two buckets of sizes greater than 1, notice the transitions of Disk 1 from 41→53 on Jan. 4, 2016 and the transitions of Disk 2 from 42→55 on Jan. 4, 2016. As such, the state i in both of these cases is [41; 50] and the state j (the destination state) is [51; 60], and therefore there are two transitions from [41; 50] →[51; 60].

Figure 8:
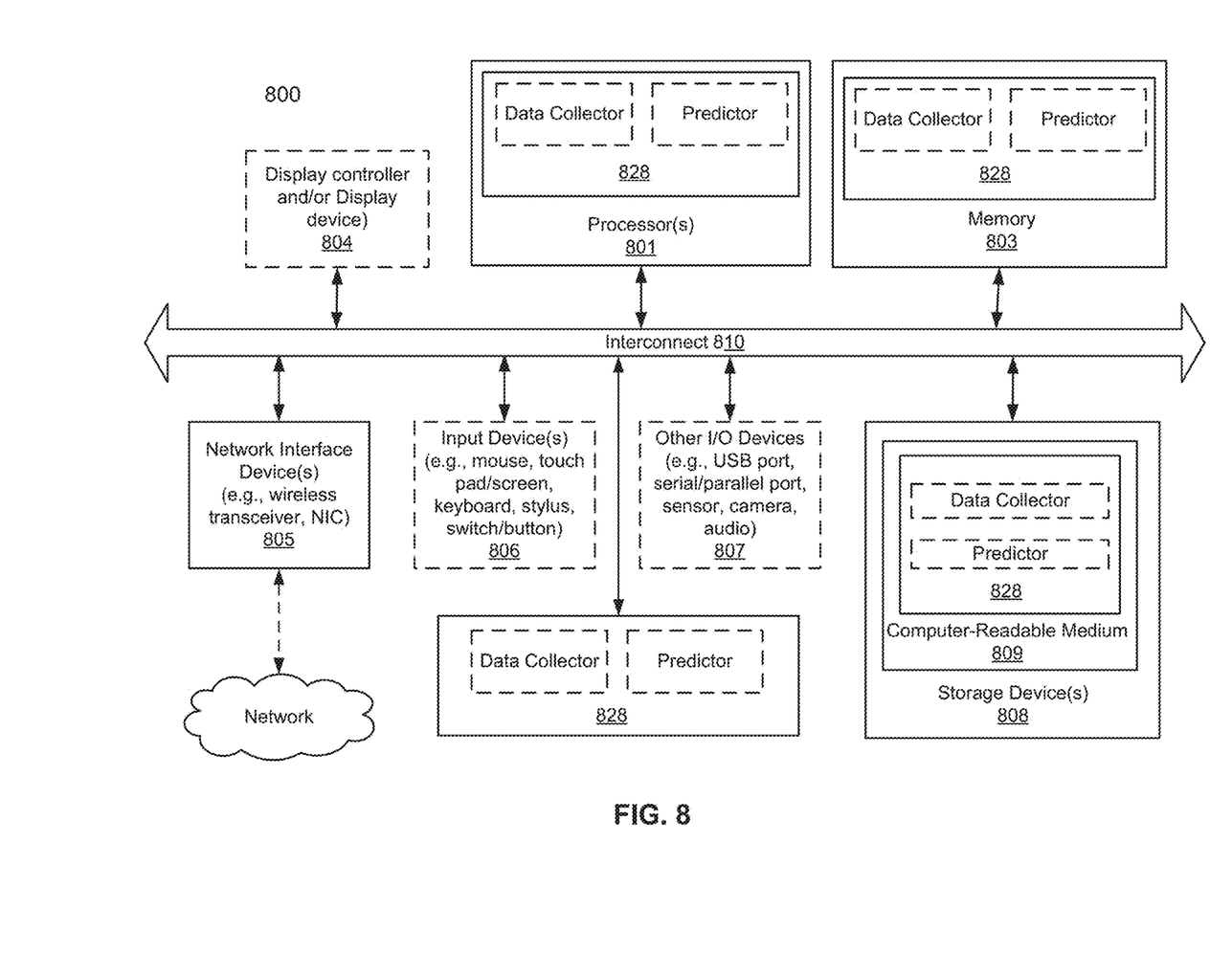
FIG. 8 is a block diagram illustrating a data processing system according to one embodiment.

FIG. 8 is a block diagram illustrating a data processing system according to one embodiment which may be used with one embodiment of the invention. For example, system 800 may represent any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 804-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 804-808, including display device(s) 804, network interface device(s) 805, optional input device(s) 806, and other optional IO device(s) 807, and storage device(s) 808. Network interface device 805 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of one or more touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However, in other embodiments, the mass storage may primarily be implemented using a HDD with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., module, unit, and/or logic 828) embodying any one or more of the methodologies or functions described herein. Module/unit/logic 828 (e.g., data collector and/or predictor) may also reside, completely or at least partially, within memory 803 and/or within processor 801 during execution thereof by data processing system 800, memory 803 and processor 801 also constituting machine-accessible storage media. Module/unit/logic 828 may further be transmitted or received over a network via network interface device 805.

Computer-readable storage medium 809 may also be used to store some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 1028 can be implemented as firmware or functional circuitry within hardware devices. Further, module/unit/logic 828 can be implemented in any combination hardware devices and software components.

Note that while system 800 is illustrated with various components of a data processing system, it is not intended to represent any particular architecture or manner of interconnecting the components, as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for predicting disk failures in a redundant array of independent disks (RAID) environment, the method comprising:
   respectively receiving hard disk status information from each set of a plurality of sets of hard disks in a storage system, wherein the hard disk status information comprises a plurality of states within the set, a number of hard disks within the set, and an indicator of how many hard disks have failed within the set;
   for each set of the plurality of sets of hard disks,
      calculating a transitional probability that a hard disk will fail within a predetermined period of time based on the respective hard disk status information, wherein calculating the transitional probability comprises:
         querying a medium error history of hard disks within the set,
         using the medium error history to identify which of the hard disks has experienced at least one medium error,
         counting a number of transitions of each of the hard disks having the at least one medium error according to different transition types, each of the transition types representing a specific transition from one of the plurality of states to another of the plurality of states, wherein the one state and the other state are of same state or different states, and
         identifying a number of transition types based on the counting, and
      generating a first risk profile for the hard disk based on the calculated transitional probability;
   generating a second risk profile for a set of hard disks based on two or more of the first risk profiles; and
   determining which of the plurality of sets of hard disks has a highest probability of failing within the predetermined period of time based on the second risk profile.

2. The method of claim 1, wherein the plurality of states within the sets of hard disks further comprises at least one of an initial state of the hard disk, a second state of the hard disk that represents, a third state of the hard disk, and an absorbing state of the hard disk, wherein the initial state of the hard disk represents a non-zero error count starting point for the transitional probability, the second state of the hard disk represents a second error count for the transitional probability that falls between the initial state and the third state, the third state of the hard disk represents a third error count for the transitional probability that falls between the second state and the absorbing state, and the absorbing state of the hard disk represents a status of FAILED for the hard disk.

3. The method of claim 1, wherein the hard disk information further comprises a non-zero error indicator, including at least one of a medium error, a remote access service error, a hardware error, a protocol error, a controller error, and a driver state error.

4. The method of claim 1, wherein the hard disk status information further comprises a manufacturer and a model of a storage system that houses the hard disk.

5. The method of claim 1, wherein the predetermined period of time further comprises at least one of: 1 day, 7 days, 30 days, and 60 days.

6. The method of claim 2, wherein calculating the transitional probability further comprises:
   further querying a hard disk failure record for each set of the sets of hard disks, the hard disk failure record including a date that each hard disk within the set failed, wherein the date is used as a timestamp to classify the hard disk within one of the plurality of states; and
   determining a second count number of transitions from the initial state of the hard disk to the second state of the hard disk, and a third count number of transitions from the initial state of the hard disk to at least one of the third state of the hard disk and the absorbing state of the hard disk.

7. The method of claim 6, wherein the transitional probability further comprises:
   a single state transition probability that is used to determine an imminent transition from one state to another state based on the plurality of states within the sets of hard disks;
   a predetermined state transition probability that is used to determine the probability of one or more state transitions in one or more predetermined number of days;
   an average period of time in a specified state that is used to determine an expected number of days that the hard disk will be within the specified state; and
   an expected period of time to failure of the sets of hard disks that is used to determine an expected number of days that the hard disk has to reach the absorption state.

8. A non-transitory machine-readable medium having instructions stored therein, which when executed by a processor, cause the processor to perform operations for predicting disk failures in RAID environment, the operations comprising:
   respectively receiving hard disk status information from each set of a plurality of sets of hard disks in a storage system, wherein the hard disk status information comprises a plurality of states within the set, a number of hard disks within the set, and an indicator of how many hard disks have failed within the set;
   for each set of the plurality of sets of hard disks,
      calculating a transitional probability that a hard disk will fail within a predetermined period of time based on the respective hard disk status information, wherein calculating the transitional probability comprises:
         querying a medium error history of hard disks within the set,
         using the medium error history to identify which of the hard disks has experienced at least one medium error,
         counting a number of transitions of each of the hard disks having the at least one medium error according to different transition types, each of the transition types representing a specific transition from one of the plurality of states to another of the plurality of states, wherein the one state and the other state are of same state or different states, and identifying a number of transition types based on the counting, and generating a first risk profile for the hard disk based on the calculated transitional probability;

generating a second risk profile for a set of hard disks based on two or more of the first risk profiles; and determining which of the sets of hard disks has a highest probability of failing within the predetermined period of time based on the second risk profile.

9. The medium of claim 8, wherein the plurality of states within the sets of hard disks further comprises at least one of an initial state of the hard disk, a second state of the hard disk that represents, a third state of the hard disk, and an absorbing state of the hard disk, wherein the initial state of the hard disk represents a non-zero error count starting point for the transitional probability, the second state of the hard disk represents a second error count for the transitional probability that falls between the initial state and the third state, the third state of the hard disk represents a third error count for the transitional probability that falls between the second state and the absorbing state, and the absorbing state of the hard disk represents a status of FAILED for the hard disk.

10. The medium of claim 8, wherein the hard disk information further comprises a non-zero error indicator, including at least one of a medium error, a remote access service error, a hardware error, a protocol error, a controller error, and a driver state error.

11. The medium of claim 8, wherein the hard disk status information further comprises a manufacturer and a model of a storage system that houses the hard disk.

12. The medium of claim 8, wherein the predetermined period of time further comprises at least one of: 1 day, 7 days, 30 days, and 60 days.

13. The medium of claim 9, wherein calculating the transitional probability further comprises:

further querying a hard disk failure record for each set of the sets of hard disks, the hard disk failure record including a date that the each hard disk within the set failed, wherein the date is used as a timestamp to classify the hard disk within one of the plurality of states; and determining a second count number of transitions from the initial state of the hard disk to the second state of the hard disk, and a third count number of transitions from the initial state of the hard disk to at least one of the third state of the hard disk and the absorbing state of the hard disk.

14. The medium of claim 13, wherein the transitional probability further comprises:

a single state transition probability that is used to determine an imminent transition from one state to another state based on the plurality of states within the sets of hard disks;

a predetermined state transition probability that is used to determine the probability of one or more state transitions in one or more predetermined number of days;

an average period of time in a specified state that is used to determine an expected number of days that the hard disk will be within the specified state; and an expected period of time to failure of the sets of hard disks that is used to determine an expected number of days that the hard disk has to reach the absorption state.

15. A system, comprising:

a processor; and a memory coupled to the processor for storing instructions, which when executed from the memory, cause the processor to perform operations for predicting disk failures in RAID environment, the operations including:

respectively receiving hard disk status information from each set of a plurality of sets of hard disks in a storage system, wherein the hard disk status information comprises a plurality of states within the set, a number of hard disks within the set, and an indicator of how many hard disks have failed within the set;

for each set of the plurality of sets of hard disks, calculating a transitional probability that a hard disk will fail within a predetermined period of time based on the respective hard disk status information, wherein calculating the transitional probability comprises:

querying a medium error history of hard disks within the set, using the medium error history to identify which of the hard disks has experienced at least one medium error, counting a number of transitions of each of the hard disks having the at least one medium error according to different transition types, each of the transition types representing a specific transition from one of the plurality of states to another of the plurality of states, wherein the one state and the other state are of same state or different states, and identifying a number of transition types based on the counting, and generating a first risk profile for the hard disk based on the calculated transitional probability;

generating a second risk profile for a set of hard disks based on two or more of the first risk profiles; and determining which of the sets of hard disks has a highest probability of failing within the predetermined period of time based on the second risk profile.

16. The system of claim 15, wherein the plurality of states within the sets of hard disks further comprises at least one of an initial state of the hard disk, a second state of the hard disk that represents, a third state of the hard disk, and an absorbing state of the hard disk, wherein the initial state of the hard disk represents a non-zero error count starting point for the transitional probability, the second state of the hard disk represents a second error count for the transitional probability that falls between the initial state and the third state, the third state of the hard disk represents a third error count for the transitional probability that falls between the second state and the absorbing state, and the absorbing state of the hard disk represents a status of FAILED for the hard disk.

17. The system of claim 15, wherein the hard disk information comprises a non-zero error indicator, including at least one of a medium error, a remote access service error, a hardware error, a protocol error, a controller error, and a driver state error, and wherein the hard disk status information further comprises a manufacturer and a model of a storage system that houses the hard disk.

18. The system of claim 15, wherein the predetermined period of time further comprises at least one of: 1 day, 7 days, 30 days, and 60 days.

19. The system of claim 16, wherein calculating the transitional probability further comprises:

further querying a hard disk failure record for each set of the sets of hard disks, the hard disk failure record including a date that each hard disk failed, wherein the date is used as a timestamp to classify the hard disk within one of the plurality of states; and determining a second count number of transitions from the initial state of the hard disk to the second state of the hard disk, and a third count number of transitions from the initial state of the hard disk to at least one of the third state of the hard disk and the absorbing state of the hard disk.

20. The system of claim 19, wherein the transitional probability further comprises:

a single state transition probability that is used to determine an imminent transition from one state to another state based on the plurality of states within the sets of hard disks;

a predetermined state transition probability that is used to determine the probability of one or more state transitions in one or more predetermined number of days;

an average period of time in a specified state that is used to determine an expected number of days that the hard disk will be within the specified state; and an expected period of time to failure of the sets of hard disks that is used to determine an expected number of days that the hard disk has to reach the absorption state.

\* \* \* \* \*